Patented Mar. 27, 1951

2,546,499

UNITED STATES PATENT OFFICE 2,546,499

SYNTHESIS OF COUMARANS

William K. T. Gleim, Orland Park, Ill., assignor to Universal Oil Products Company, Chicago, Ill., a corporation of Delaware No Drawing. Application March 5, 1949, Serial No. 79,907

3 Claims. (Cl. 260—346)

This invention relates to the synthesis of coumarans and more particularly to the preparation of alkyl substituted coumarans and chromans.

More particularly the present invention is directed to an improvement in the process for effecting cyclization and alkylation in one step of an o-allyl phenol.

o-Allyl phenols are generally prepared in two steps. In the first step a phenolic compound, including monohydric and dihydric benzenes, is reacted with an allylic halide in the presence of a basic catalyst to form the corresponding monoether. Thus, a β-alkallyl halide may be reacted with phenol to form a coumaran. When the hydroxy compounds are desired, a dihydroxy phenol including hydroquinone, catechol or resorcinol is employed.

The monoether is then rearranged to an o-allyl phenol, including dihydric phenols, and this is readily accomplished by heating the o-allyl phenol to a temperature ranging from about 200° C. to about the boiling point of the phenol ether.

In accordance with the present invention an o-allyl phenol, prepared in a manner hereinbefore set forth or in any other suitable manner, is used as the starting material for the present process and is converted into an alkylated bicyclic compound.

In accordance with the present invention, the o-allyl phenol is reacted with an alkylating agent in the presence of an alkylating catalyst. Suitable alkylating agents include an olefin, alcohol or other olefin producing material. Thus, if a tertiary butyl alkylated compound is desired, isobutylene or tertiary butyl alcohol may be used as the alkylating agent. In the case of the monohydric phenols, the alkylating agent will be substituted in a position para to the hydroxyl group. In the case of dihydric phenols, the alkylating agent will be attached at a position ortho or para to the hydroxyl group.

Any suitable alkylation catalyst may be employed. Particularly preferred alkylating catalysts comprise acids such as sulfuric acid, phosphoric acid, hydrofluoric acid, etc. In some cases, aluminum chloride or other suitable metal halides may be employed but not necessarily with equivalent results.

The reaction may be effected at a suitable temperature which, in general, will range from atmospheric to about 100° C. The particular temperature to be employed will depend upon the strength of the acid catalyst used and, in general, it may be stated that lower temperatures may be employed with the concentrated acids while higher temperatures are required with the dilute acids.

In accordance with the present invention o-allyl phenols are converted into alkylated bicyclic compounds in one step. It is apparent that this process has the advantage of accomplishing both the cyclization reaction and the alkylation reaction in a single step and thereby eliminates the necessity for two separate reaction equipments.

As further examples of typical reactions effected in accordance with the present invention, o-methallyl hydroquinone and tertiary butyl alcohol may be refluxed in the presence of phosphoric acid to form 6-t-butyl-2,2-dimethyl-5-hydroxycoumaran. The o-methallyl hydroquinone may be prepared by reacting hydroquinone with methallyl chloride and the resultant monomethallyl ether of hydroquinone heated at a temperature of the order of 250° C. to rearrange the hydroquinone monomethallyl ether to o-methallyl hydroquinone.

When a hydroxychroman is desired 2,γ,γ-dimethallyl hydroquinone is reacted with a suitable alkylating agent in the presence of the catalyst to form the corresponding alkylated hydroxychroman. Thus, when the alkylating agent comprises tertiary butyl alcohol, the product will comprise a 7-tertiary butyl-6-hydroxychroman.

When phenol (monohydroxybenzene) is used in place of a dihydric phenol, the resultant product will be an alkylated coumaran. Thus, the reaction of 2-β-methallyl phenol and tertiary butyl alcohol in the presence of the catalyst will form 2,2-dimethyl-5-tertiary butyl coumaran. Similarly, the reaction of 2-γ,γ-dimethallyl phenol with tertiary butyl alcohol will produce 2,2-dimethyl-6-tertiary butyl chroman.

The coumarans and chromans formed in accordance with the present invention are useful as antioxidants in organic substances which deteriorate due to oxidation, polymerization, or other undesired reactions. These compounds are also used as biological control factors, medicinal agents and for other purposes.

The following examples are introduced to illustrate further the novelty and utility of the present invention but not with the intention of unduly limiting the same.

Example I 2-methallyl hydroquinone was reacted with isobutylene at room temperature in the presence of concentrated sulfuric acid. The reaction is exothermic and the temperature rose to 80° C. The products were cooled and 2,2-dimethyl-6-tertiary-butyl-5-hydroxycoumaran was recovered from the resultant products.

*Example II*

In another operation similar to that described in Example I, 80% sulfuric acid was employed as the catalyst and the reaction was effected at a temperature of 80–90° C. 2,2-dimethyl-6-tertiarybutyl-5-hydroxycoumaran was likewise prepared in this manner.

I claim as my invention:

1. A method of preparing a 5-hydroxy-6-alkyl-coumaran which comprises reacting a 2-allyl hydroquinone and an olefin in the presence of an alkylating catalyst.

2. A method of preparing 2,2-dimethyl-6-tertiarybutyl-5-hydroxycoumaran which comprises reacting a 2-$\beta$-methallyl hydroquinone with isobutylene in the presence of a mineral acid catalyst.

3. A method of preparing 2,2-dimethyl-6-tertiarybutyl-5-hydroxycoumaran which comprises reacting a 2-$\beta$-methallyl hydroquinone with isobutylene in the presence of a sulfuric acid catalyst.

WILLIAM K. T. GLEIM.

REFERENCES CITED

The following references are of record in the file of this patent:

UNITED STATES PATENTS

| Number | Name | Date |
|---|---|---|
| 2,270,634 | Isler | Jan. 20, 1942 |
| 2,362,479 | Gibbs | Nov. 14, 1944 |
| 2,421,812 | Smith et al. | June 10, 1947 |